March 18, 1958
P. A. LINDER
2,827,156
CONVEYOR FOR ANIMAL FEED TROUGHS
Filed May 24, 1956
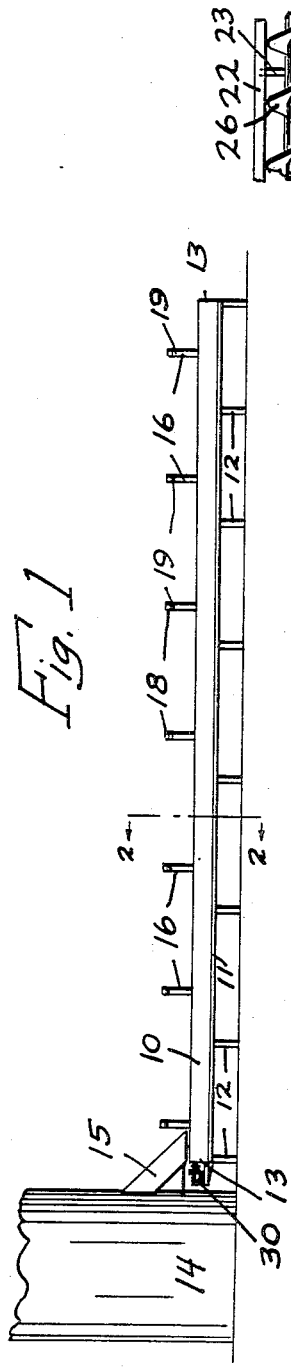
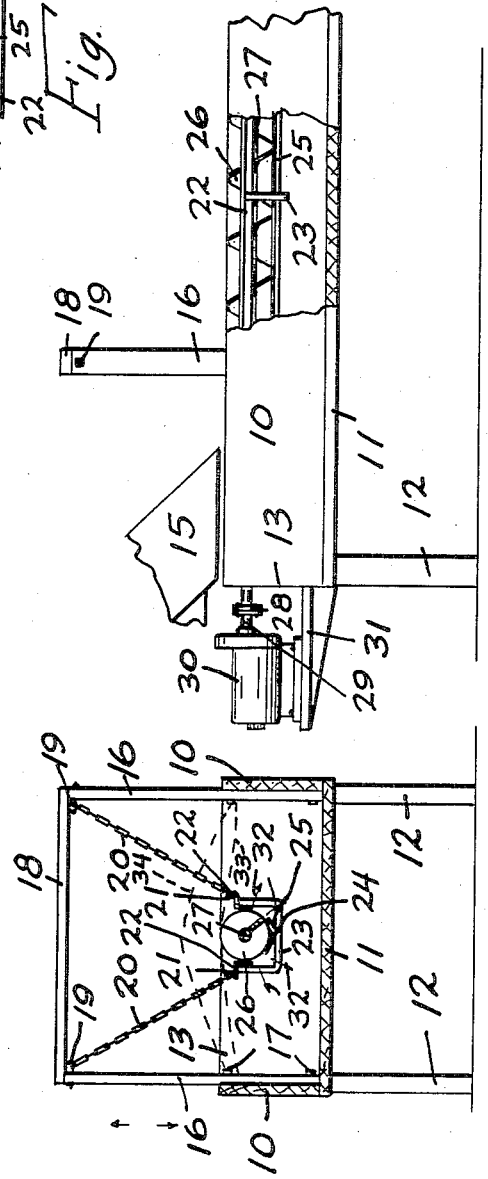
INVENTOR.
Paul A. Linder
BY
Sam J. Slotsky
ATTORNEY United States Patent Office 2,827,156
Patented Mar. 18, 1958

2,827,156

CONVEYOR FOR ANIMAL FEED TROUGHS

Paul A. Linder, Hartley, Iowa

Application May 24, 1956, Serial No. 587,021

2 Claims. (Cl. 198—213)

My invention relates to a conveyor for animal feed troughs.

An object of my invention is to provide a conveyor which can be positioned within an animal feed trough, and wherein the conveyor will convey silage, or any other material, along the complete length of the trough, which will distribute the silage or other feed uniformly, and which can be constructed at a reasonable cost.

A further object of my invention is to provide a conveyor of this type which can be adjusted vertically within the feed trough to provide for varying conditions of feed.

A further object of my invention is to provide a conveyor which conveys the material laterally and forwardly without requiring the use of tubes, openings, or such similar constructions.

A further object of my invention is to provide powered means for driving the conveyor whereby the conveyor can be started or stopped at will.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of a feed trough using my invention,

Figure 2 is an enlarged sectional view taken along the lines 2—2 of Figure 1,

Figure 3 is an enlarged detail taken partially in cross section, and

Figure 4 is a plan view of a portion of the conveyor.

My invention contemplates the provision of a simple conveyor mechanism usable in animal feed troughs and wherein the distribution and conveyance of the feed can be regulated for a variety of conditions, and whereby the conveyor will also eliminate the need for the cumbersome method of replenishing the trough from a wagon or the like.

I have used the character 10 to indicate the side walls of a conventional lengthened feed trough, the character 11 indicating the bottom wall, the character 12 indicating spaced legs for supporting the trough, and the character 13 indicating end walls.

I have further used the character 14 to designate a silo which is adapted to discharge its contents into the trough, the character 15 indicating a chute communicating with the silo and adapted to deposit the silage or other feed material into the trough, it being understood, however, that the trough can be fed from any other arrangement.

I have further used the character 16 to indicate a series of spaced posts which are suitably secured at 17 to the sides 10, and attached across the top of the posts 16 are the braces 18. Attached to the posts 16 are the hook members 19 to which are attached the chains 20, these chains extending downwardly and being attached at 21 to the lengthened angle members 22 to which angle members are attached a series of spaced U-shaped members 23, and welded at 24 to the various spaced members 23 is an angular-shaped lengthened member 25 which can be either angular shaped as shown or which could be a flat strip.

Resting upon the angle member 25 is a continuous helical conveyor member 26 which is attached to the centrally positioned shaft 27, this conveyor member extending the complete length of the trough, and which conveyor member can be made up of attached sections if desired, it being noted that the conveyor member will rest upon the member 25 and be supported thereby, this conveyor member also being within the confines of the angle members 22 and the members 23.

The shaft 27 extends through the forward wall 13 of the trough and can be attached to a coupling member 28 which is attached to the motor shaft 29 which is driven by means of the geared electric motor 30, the motor 30 being supported on a suitable braket 31 which is secured to the end wall and braced as shown.

The device operates in the following manner. The chute 15, which is centrally positioned, will deposit the silage or shelled corn, whichever is to be fed, directly into the end of the spiral conveyor 26, and when the electric motor 30 is started, as the material gravitates, the silage will be impelled forwardly along the feed trough, and at the same time it will gravitate laterally and through the sides of the arrangement in the direction of the arrows 32 since there are no barriers along the sides, and no barriers along the bottom portions. As soon as the material fills one portion of the chute, the tendency is for the spiral conveyor to gradually feed the material forwardly since the material will not build upwardly to a greater height than the conveyor unit itself, and as a result, the feed material is distributed gradually and evenly, and also provides means wherein the material will not freeze since the material is loosely distributed. The position shown in Figure 2 is the approximate position when shelled corn is being used, however, for silage, which is more closely packed, the entire conveyor unit can be raised by placing other links of the chains 20 in the hooks 19 so that the conveyor unit is positioned at a higher elevation, whereby the coarser silage will then be evenly distributed, since the coarser silage will require a greater elevation for an even distribution, and by this means, the conveyor can be regulated as to height. For instance, the dotted lines character 33 will indicate the approximate level for distributing shelled corn, whereas the dotted lines character 34 will indicate the approximate level for distributing silage, the latter distribution requiring a higher elevation of the conveyor unit. Other arrangements for adjustably positioning the conveyor unit vertically could also be employed.

I have found that the arrangement requires a minimum of power for driving the shaft 27, and as stated above, distributes the material laterally and longitudinally in a very uniform manner, the adjusting means also providing means for regulating the type of feed used.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A conveyor for animal feed troughs comprising a conveyor member positioned within said trough, said conveyor member comprising a base strip, a helical conveyor element resting upon said base strip and supported thereby, means for driving said helical conveyor element including a centrally positioned shaft attached thereto, a plurality of horizontally spaced bracket members attached to said base strip, longitudinal members secured to the upper ends of said bracket members, said helical conveyor element being thereby adapted to discharge material lengthwise thereof and laterally therefrom, said bracket members being substantially U-shaped and supporting said base strip, the discharge of said material passing through the unrestricted space provided between said bracket members and adjacent to said base strip, means for adjustably positioning said conveyor member vertically, including posts attached to said trough, chains secured to said posts, said chains being attached to said longitudinal members, said chains providing means whereby attachment of desired links thereof will regulate the height of said conveyor member.

2. A conveyor for animal feed troughs comprising a conveyor member positioned within said trough, said conveyor member comprising a base strip, a helical conveyor element resting upon said base strip and supported thereby, means for driving said helical conveyor element including a centrally positioned shaft attached thereto, a plurality of horizontally spaced bracket members attached to said base strip, longitudinal members secured to the upper ends of said bracket members, said helical conveyor element being thereby adapted to discharge material lengthwise thereof and laterally therefrom, said bracket members being substantially U-shaped and supporting said base strip, the discharge of said material passing through the unrestricted space provided between said bracket members and adjacent to said base strip, means for adjustably positioning said conveyor member vertically, including posts attached to said trough, chains secured to said posts, said chains being attached to said longitudinal members, said chains providing means whereby attachment of desired links thereof will regulate the height of said conveyor member, an electric motor attached to said shaft to drive the same.

References Cited in the file of this patent
UNITED STATES PATENTS

| | | |
|---|---|---|
| 2,738,766 | Hart | Mar. 20, 1956 |
| 2,745,381 | Wallace | May 15, 1956 |